(12) United States Patent
Hirata

(10) Patent No.: US 7,664,199 B2
(45) Date of Patent: Feb. 16, 2010

(54) TRANSMISSION POWER CONTROL FOR MOBILE TELECOMMUNICATION: TERMINAL DEVICE, METHOD AND CONTROL PROGRAM

(75) Inventor: Masaru Hirata, Tokyo (JP)

(73) Assignee: NEC Corporation, Tokyo (JP)

( * ) Notice: Subject to any disclaimer, the term of this patent is extended or adjusted under 35 U.S.C. 154(b) by 588 days.

(21) Appl. No.: 11/198,184

(22) Filed: Aug. 8, 2005

(65) Prior Publication Data

US 2006/0029156 A1    Feb. 9, 2006

(30) Foreign Application Priority Data

Aug. 9, 2004    (JP) .............................. 2004-232357

(51) Int. Cl.
   *H04L 25/03*    (2006.01)
(52) U.S. Cl. ...................................... 375/296; 375/295
(58) Field of Classification Search ................. 375/295, 375/296
   See application file for complete search history.

(56) References Cited

U.S. PATENT DOCUMENTS

| 6,341,224 | B1 | 1/2002 | Dohi et al. |
| 6,526,261 | B1 | 2/2003 | Takeuchi et al. |
| 6,639,934 | B1 | 10/2003 | Engström et al. |
| 6,963,753 | B1 | 11/2005 | Hamabe |
| 2002/0012383 | A1 * | 1/2002 | Higuchi et al. .............. 375/141 |
| 2002/0198014 | A1 | 12/2002 | Miyamoto et al. |
| 2003/0134656 | A1 * | 7/2003 | Chang et al. ................. 455/522 |

FOREIGN PATENT DOCUMENTS

| EP | 1 168 657 A | 1/2002 |
| EP | 1 494 370 A1 | 1/2005 |
| JP | 2000-138633 A | 5/2000 |
| JP | 2000-252917 A | 9/2000 |
| JP | 2002-540674 A | 11/2002 |
| JP | 2002-543663 A | 12/2002 |
| WO | WO 97/50197 A1 | 12/1997 |
| WO | WO 03/085861 A | 10/2003 |

* cited by examiner

*Primary Examiner*—David C. Payne
*Assistant Examiner*—Nader Bolourchi
(74) *Attorney, Agent, or Firm*—Foley & Lardner LLP

(57) ABSTRACT

A mobile telecommunication terminal device is provided which is capable of preventing an excessive increase in transmitting power to be fed from a base station even if a burst error occurs in a mobile unit. The mobile telecommunication terminal device has an error frequency calculating section to calculate a frequency of detection of errors in received data, a target transmitting power setting section to decrease a set value of a target SIR (Signal to Interference Power Ratio) when the frequency of detection of errors is not larger than the target SIR, while the frequency of detection of errors exceeds the target detection frequency value, to increase the set value of the target SIR, an SIR measuring section, an SIR comparing section, a transmitting power requesting section, and an error frequency correcting section.

44 Claims, 3 Drawing Sheets

TRANSMISSION POWER CONTROL FOR
MOBILE TELECOMMUNICATION:
TERMINAL DEVICE, METHOD AND
CONTROL PROGRAM

BACKGROUND OF THE INVENTION

1. Field of the Invention

The present invention relates to a mobile telecommunication terminal device, a mobile telecommunication method, and a mobile telecommunication control program.

The present application claims priority of Japanese Patent Application No. 2004-232357 filed on Aug. 9, 2004, which is hereby incorporated by reference.

2. Description of the Related Art

For example, in the mobile telecommunication of a W-CDMA (Wideband-Code Division Multiplex Access) method, one frequency band is used in common by a plurality of users. That is, transmitting power for one frequency band to be supplied from a base station to a mobile unit is shared for use among a plurality of users.

As a result, if much power is consumed by one user, a limitation is imposed on an amount of power that can be assigned to other users and, therefore, the number of users (the number of mobile units) being able to carry out communication at one time is made to decrease.

On the other hand, signal receiving quality of the mobile unit changes depending on a positional relation and/or surrounding conditions and communication is made difficult due to poor signal receiving environments and additionally to decreased transmitting power to be fed from the base station.

Due to such communication environments as above, in order to simultaneously achieve uniformity of signal receiving quality of the mobile unit irrespective of its position and inhibition of occupation of transmitting power to be fed from the base station by only one user, the transmitting power from the base station is controlled from the mobile unit side.

In other words, if communication can be satisfactorily carried out even by a small amount of transmitting power, a request is made by the mobile unit asking the base station to decrease the transmitting power to be supplied to the mobile unit to enable many users to carry out communication at the same time, while, if a large amount of transmitting power is required for carrying out communication, the mobile unit makes a request asking the base station to increase the transmitting power to be fed to the mobile unit and, therefore, the mobile unit can maintain the receiving quality.

Here, the mobile unit detects an occurrence frequency (error rate) of a CRC (Cyclic Redundancy Check) error and, in order to keep the occurrence frequency at a level being not larger than a targeted low level (target error rate), controls transmitting power to be fed from the base station. That is, only when the error rate is raised until the error rate reaches the target error rate, a request is made by the mobile unit asking the base station to increase the transmitting power. The base station having received the request, if having sufficient transmitting power, increases the transmitting power to be fed to a corresponding mobile unit.

More specifically, the mobile unit detects the number of occurrences of CRC errors in received data in a unit time interval and changes a set value of a target SIR (Signal to Interference power Ratio) every time when the error rate reaches the target error rate due to the increased number of times of detection.

However, a conventional mobile telecommunication terminal device has a problem in that, even if an error rate is sporadically raised (in the case of a burst error) due to some reason (for example, a car hides momentarily behind a shadow of a building), the mobile unit recognizes that many errors have occurred and exerts control to increase transmitting power unnecessarily and, as a result, the number of users who can carry out communication in an area decreases.

FIGS. 3A and 3B are diagrams explaining problems of the conventional technology. FIG. 3A shows a change with time in the number of times of detection of CRC errors in a unit time interval in the mobile unit and FIG. 3B shows a change with time in set values of the target SIR (ordinate) on the mobile unit side.

As shown in FIG. 3A, every time the number of times of detection of CRC errors in a unit time interval becomes large and every time an error rate reaches the target error rate (FIG. 3A), the mobile unit changes a set value of the target SIR (target SIR) (FIG. 3B) so as to have a large value.

Moreover, when a burst error occurs, in particular, that is, when the number of times of detection of CRC errors becomes extremely larger in a unit time interval, the set value of the target SIR also is set to become extremely larger.

As a result, transmitting power to be fed to the corresponding mobile unit is changed to have an extremely large value and the number of users who can carry out communication in the area becomes extremely small.

Moreover, since a change of a set value of the target SIR is made only in every unit time interval, if the target SIR is once set to be a large value, it is not easy for the target SIR to converge on a standard target SIR value.

Due to this, a state in which transmitting power to be supplied from the base station to the corresponding mobile unit continues long and, during the period, the number of users being able to carry out communication is limited.

SUMMARY OF THR INVENTION

In view of the above, it is an object of the present invention to provide a mobile telecommunication terminal device which is capable of preventing transmitting power to be fed from a base station from becoming extremely large even in the case of occurrence of a burst error caused by some reason, a mobile telecommunication method, and a mobile telecommunication control program.

According to a first aspect of the present invention, there is provided a mobile telecommunication terminal device including:

an error frequency calculating section to calculate a detection frequency of errors received in received data;

a target transmitting power setting section to decrease an SIR (Signal to Interference Power Ratio) to be targeted when the detection frequency of errors calculated by the error frequency calculating section is not larger than a target detection frequency value and to increase a set value of the SIR to be targeted when the detection frequency of errors exceeds the target detection frequency value;

an SIR measuring section to measure an SIR of a received signal;

an SIR comparing section to compare the SIR measured by the SIR measuring section with the target SIR set by the target transmitting power setting section;

a transmitting power requesting section to make a request for lowering the SIR of the received signal when the measured SIR is judged by the SIR comparing section as being not smaller than the target SIR and a request for raising the SIR of the received signal when the measured SIR is judged by the SIR comparing section as being less than the target SIR; and an error frequency correcting section to make a correction so that the detection frequency of errors becomes a value being smaller than an actual value when the detection frequency of errors calculated by the error frequency calculating section exceeds a predetermined threshold value.

In the foregoing first aspect, a preferable mode is one wherein the error frequency calculating section calculates the detection frequency of CRC errors in received data.

According to a second aspect of the present invention, there is provided a mobile telecommunication terminal device including:

an antenna, a decoding section to generate decoded data by decoding a signal received via the antenna;

an error detecting section to detect errors contained in the decoded data;

an error frequency calculating section to calculate a detection frequency of errors to be detected by the error detecting section;

a target transmitting power setting section to decrease a set value of an SIR (Signal to Interference Power Ratio) to be targeted when the detection frequency of errors calculated by the error frequency calculating section is not larger than a target detection frequency value and to increase the set value of the SIR to be targeted when the detection frequency of errors exceeds the target detection frequency value;

an SIR measuring section to measure an SIR of received signal based on the decoded data;

an SIR comparing section to compare the SIR measured by the SIR measuring section with the target SIR set by the target transmitting power setting section;

a transmitting power control data generating section to generate control data used to make a request for decreasing the SIR of the received signal when the measured SIR is judged by the SIR comparing section as being not smaller than the target SIR and to generate control data used to make a request for increasing the SIR of the received signal when the measured SIR is judged by the SIR comparing section as being less than the target SIR;

a signal transmitting section to transmit control data generated by the transmitting power control data generating section and encoded communication data; and an error frequency correcting section to make a correction so that the detection frequency of errors becomes a value being smaller than an actual value when the detection frequency of errors calculated by the error frequency calculating section exceeds a predetermined threshold value.

In the foregoing, a preferable mode is one wherein the error detecting section detects CRC errors in decoded data and the error frequency calculating section calculates the detection frequency of CRC errors detected by the error detecting section.

Also, a preferable mode is one wherein the error frequency correcting section makes a correction so that the detection frequency of errors calculated by the error frequency calculating section becomes the threshold value.

In the foregoing second aspect, a preferable mode is one wherein the error frequency correcting section makes a correction to the detection frequency of errors calculated by the error frequency calculating section by multiplying the number of accumulated errors by a coefficient being less than 1 (one).

Also, in the foregoing first and second aspects, a preferable mode is one wherein the error frequency correcting section makes a correction so that the detection frequency of errors calculated by the error frequency calculating section becomes a value being less than the threshold value.

Also, a preferable mode is one wherein the error frequency calculating section calculates the detection frequency of errors during a unit time interval in received data.

Also, a preferable mode is one wherein the error frequency calculating section calculates the detection frequency of errors contained in received data per a unit time.

Also, a preferable mode is one wherein the error frequency calculating section calculates the detection frequency of errors during a unit time interval of received data and wherein the error frequency correcting section makes a correction to the frequency of detection of errors when the frequency of detection of errors calculated by the error frequency calculating section exceeds a predetermined threshold value successively during a plurality of unit time intervals in received data.

Also, a preferable mode is one wherein communication is carried out according to a CDMA communication method.

According to a third aspect of the present invention, there is provided a mobile telecommunication method including:

a calculating step of calculating a detection frequency of errors in received data;

a target transmitting power setting step of decreasing a set value of an SIR (Signal to Interference Power Ratio) to be targeted when the detection frequency of errors calculated in the calculating step is not larger than a target detection frequency value and of increasing the set value of the SIR to be targeted when the detection frequency of errors exceeds the target detection frequency value;

an SIR measuring step of measuring an SIR of a received signal;

an SIR comparing step of comparing the SIR measured in the SIR measuring step with the target SIR set in the target transmitting power setting step;

a transmitting power requesting step of making a request for decreasing the SIR of the received signal when the measured SIR is not smaller than the target SIR and a request for increasing the SIR of the received signal when the measured SIR is less than the target SIR; and an error frequency correcting step of making a correction so that the detection frequency of errors is smaller than an actual value when the detection frequency of errors calculated in the calculating step exceeds a predetermined threshold value.

According to a fourth aspect of the present invention, there is provided a mobile telecommunication method including:

a decoding step of generating decoded data by decoding a signal received via an antenna;

an error detecting step of detecting errors contained in received data;

an error frequency calculating step of calculating a detection frequency of errors in the error detecting step;

a target transmitting power setting step of decreasing a set value of an SIR (Signal to Interference Power Ratio) to be targeted when the detection frequency of errors calculated in the error frequency calculating step is not larger than a target detection frequency value and of increasing the set value of the SIR to be targeted when the detection frequency of errors exceeds the target detection frequency value;

an SIR measuring step of measuring an SIR of received signal based on the decoded data;

an SIR comparing step of comparing the SIR measured in the SIR measuring step with the target SIR set in the target transmitting power setting step;

a transmitting power control data generating step of generating control data used to make a request for decreasing the SIR of the received signal when the measured SIR is not smaller than the target SIR and of generating control data used to make a request for increasing the SIR of the received signal when the measured SIR is less than the target SIR;

a transmitting step of transmitting control data generated in the transmitting power control data generating step and encoded communication data; and an error frequency correcting step of making a correction so that the detection frequency of errors becomes a value being smaller than an actual value when the detection frequency of errors calculated in the error frequency calculating step exceeds a predetermined threshold value.

According to a fifth aspect of the present invention, there is provided a control program to cause a computer to implement a mobile telecommunication method including:

a calculating step of calculating a detection frequency of errors in received data;

a target transmitting power setting step of decreasing a set value of an SIR (Signal to Interference Power Ratio) to be targeted when the detection frequency of errors calculated in the calculating step is not larger than a target detection frequency value and of increasing the set value of the SIR to be targeted when the detection frequency of errors exceeds the target detection frequency value;

an SIR measuring step of measuring an SIR of a received signal;

an SIR comparing step of comparing the SIR measured in the SIR measuring step with the target SIR set in the target transmitting power setting step;

a transmitting power requesting step of making a request for decreasing the SIR of the received signal when the measured SIR is not smaller than the target SIR and a request for increasing the SIR of the received signal when the measured SIR is less than the target SIR; and an error frequency correcting step of making a correction so that the detection frequency of errors is smaller than an actual value when the detection frequency of errors calculated in the calculating step exceeds a predetermined threshold value.

According to a sixth aspect of the present invention, there is provided a control program to cause a computer to implement a mobile telecommunication method including:

a decoding step of generating decoded data by decoding a signal received via an antenna;

an error detecting step of detecting errors contained in received data;

an error frequency calculating step of calculating a detection frequency of errors in the error detecting step;

a target transmitting power setting step of decreasing a set value of an SIR (Signal to Interference Power Ratio) to be targeted when the detection frequency of errors calculated in the error frequency calculating step is not larger than a target detection frequency value and of increasing the set value of the SIR to be targeted when the detection frequency of errors exceeds the target detection frequency value;

an SIR measuring step of measuring an SIR of received signal based on the decoded data;

an SIR comparing step of comparing the SIR measured in the SIR measuring step with the target SIR set in the target transmitting power setting step;

a transmitting power control data generating step of generating control data used to make a request for decreasing the SIR of the received signal when the measured SIR is not smaller than the target SIR and of generating control data used to make a request for increasing the SIR of the received signal when the measured SIR is less than the target SIR;

a transmitting step of transmitting control data generated in the transmitting power control data generating step and encoded communication data; and an error frequency correcting step of making a correction so that the detection frequency of errors becomes a value being smaller than an actual value when the detection frequency of errors calculated in the error frequency calculating step exceeds a predetermined threshold value.

With the above configurations, even when a burst error occurs in the mobile unit due to some reason, it is made possible to avoid a request asking a base station to extremely raise an SIR and, therefore, the base station does not consume large transmitting power unnecessarily when supplying the transmitting power to a corresponding mobile unit, thus preventing an extreme decrease in the number of users who can carry out communication at one time in a communication area.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

Figure 1:
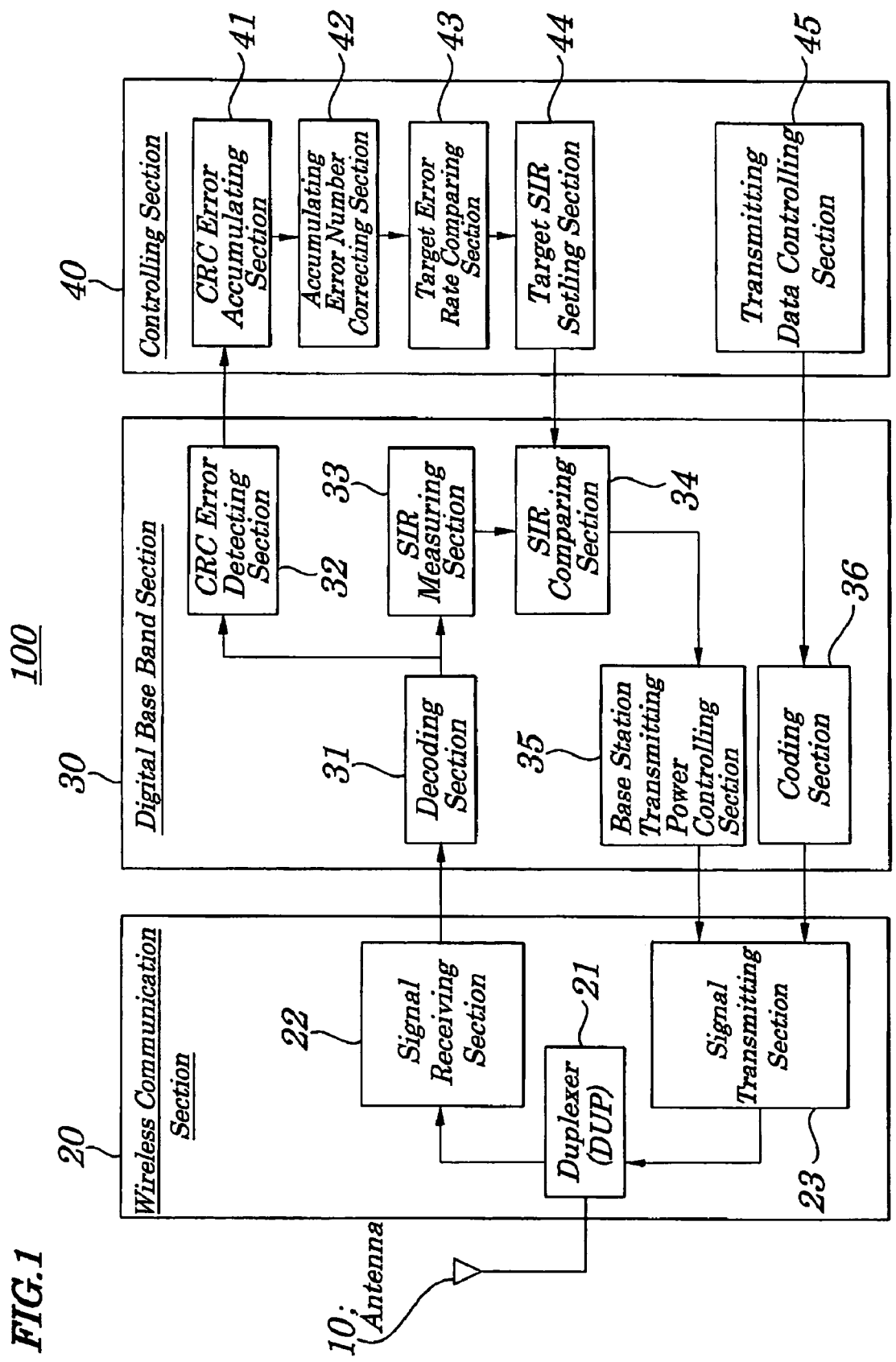
FIG. 1 is a block diagram showing configurations of a mobile telecommunication terminal device of an embodiment of the present invention.

FIG. 1 is a block diagram showing configurations of a mobile telecommunication device 100 according to a preferable embodiment of the present invention.

The mobile telecommunication device 100 (hereinafter, simply referred to as a "mobile unit") of the embodiment of the present invention is a terminal device to carry out communication by a W-CDMA communication method and, as described below, determines a target SIR (Signal to Interference power Ratio) value by employing an outer loop control method and makes a request asking a base station to increase or decrease transmitting power.

The mobile unit 100, as shown in FIG. 1, includes an antenna 10 to receive and transmit a signal by radio waves, a wireless communication section 20 to carry out wireless communication, a digital base band section 30, and a controlling section 40.

The wireless communication section 20 includes a duplexer 21, a signal receiving section 22, and a signal transmitting section 23. The digital base band section 30 includes a decoding section 31, a CRC (Cyclic Redundancy Check) error detecting section 32, an SIR measuring section 33, an SIR comparing section 34, a base station transmitting power controlling section 35, and a coding section 36. The controlling section 40 includes a CRC error accumulating section 41, an accumulating error number correcting section 42, a target error rate comparing section 43, a target SIR setting section 44, and a transmitting data controlling section 45.

Moreover, the controlling section 40 is made up of a CPU (Central Processing Unit) and memories which store programs for controlling. The CPU operates according to the programs to achieve functions of the CRC error accumulating section 41, the accumulating error number correcting section 42, the target error rate comparing section 43, the target SIR setting section 44, and the transmitting data controlling section 45.

The duplexer 21 of the wireless communication section 20 outputs only signals having a frequency component in a signal receiving band out of signals having been received through the antenna 10, while outputting only signals having a frequency component in a signal transmitting band out of signals to be output from the signal transmitting section 23.

The signal receiving section 22 outputs signals to be output from the duplexer 21 to the digital base band section 30.

The decoding section 31 of the digital base band section 30 decodes signals to be output from the signal receiving section 22 of the wireless communication section 20 to generate decoded data and outputs the decoded data to the CRC error detecting section 32 and to the SIR measuring section 33.

The SIR measuring section 33 measures a received SIR, that is, an SIR of a received signal based on decoded data fed from the decoding section 31 and informs the SIR comparing section 34 of the measured value.

On the other hand, the CRC error detecting section 32 detects existence or non-existence of a CRC error in decoded data fed from the decoding section 31 and, when detecting a CRC error, outputs CRC error information to the controlling section 40.

The CRC error accumulating section 41 of the controlling section 40 counts the number of pieces of the CRC error information to be input from the CRC error detecting section 32, that is, the accumulated number of CRC errors. A length of a unit time interval during which the number of the CRC errors (input number of CRC error information) is accumulated is set, in general, to be a value obtained based on a target error rate designated from a high-order layer.

The CRC error accumulating section 41 informs the accumulating error number correcting section 42 of the number of the CRC errors (accumulated number of errors) that have been accumulated in a unit time interval.

The accumulating error number correcting section 42 compares an accumulated number of errors informed by the CRC error accumulating section 41 with a threshold value of a predetermined number of errors (error number threshold value) and, if the accumulated number of errors is not larger than an error number threshold value, informs that the target error rate comparing section 43 of the accumulated number of errors as they are, while, if the accumulated number of errors exceeds the error number threshold value, makes a correction to use the error number threshold value as the accumulated number of errors.

Therefore, an upper limit value of the accumulated number of errors to be informed from the accumulating error number correcting section 42 to the target error rate comparing sector 43 becomes equal to the error number threshold value.

The target error rate comparing section 43 compares a frequency of occurrence of a CRC error indicated by the accumulated number of errors with a predetermined target error rate and, if the frequency of occurrence of the CRC error indicated by the accumulated number of errors is at a low level being not larger than the target error rate, gives information that a target SIR is lowered to the target SIR setting section 44. On the other hand, if the frequency of occurrence of the CRC errors indicated by the accumulated number of errors is at a high level exceeding the target error rate, the target error rate comparing section 43 gives information showing that the target SIR is raised to the target SIR setting section 44.

The target SIR setting section 44 makes the SIR comparing section 34 of the digital base band section 30 set a target SIR value according to the information to be fed from the target error rate comparing section 43. That is, if the information showing that the target SIR is raised is given, the target SIR setting section 44 makes the SIR comparing section 34 set a target SIR being higher than the previous value, while, if the information showing that the target SIR is lowered is given, makes the SIR comparing section 34 set the target SIR being lower than the previous value.

The SIR comparing section 34 compares a target SIR set by the target SIR setting section 44 with a measured value of a receiving SIR informed from the SIR measuring section 33 and, if the measured value of the SIR is larger than the target SIR, gives the information to the base station transmitting power controlling section 35 so as to decrease transmitting power, while, if the measured value of the receiving SIR is smaller than the target SIR, gives the information to the base station transmitting power controlling section 35 so as to increase the transmitting power.

The base station transmitting power controlling section 35 informs the wireless communication section 20 of controlling data in order to inform the base station of contents of information (transmitting power controlling signal) fed from the SIR comparing section 34.

The signal transmitting section 23 of the wireless communication section 20 transmits data set by the transmitting data controlling section 45 of the controlling section 40 and data encoded by the encoding section 36 of the digital base band section 30 (for example, voice data to be transmitted to a party with whom transmission is carried out, character data, image data, or a like) and controlling data (request signal to decrease or increase the SIR) informed from the base station transmitting power controlling section 35, to the antenna 10 via the duplexer 21.

Next, operations of the mobile unit 100 are described by referring to FIG. 2.

Figure 2A:
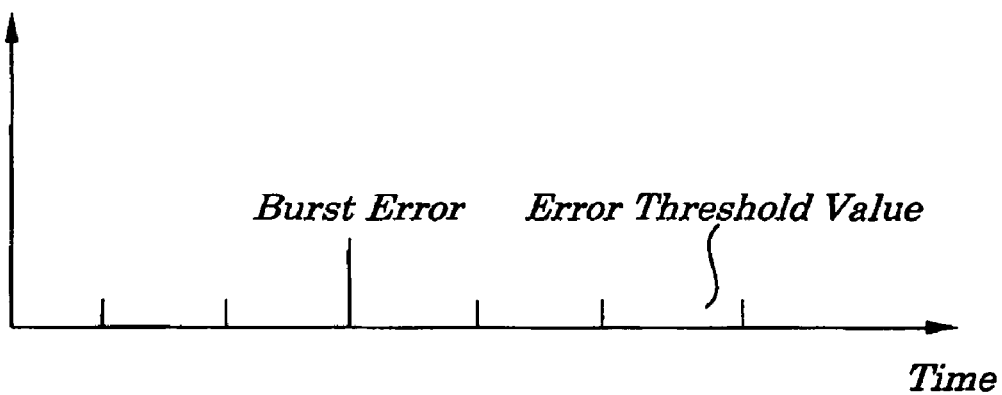
FIGS. 2A and 2B are diagrams explaining operations of the mobile telecommunication terminal device of the embodiment of the present invention and FIG. 2A shows a change with time in the number of times of detection of CRC errors (ordinate) in a unit time interval and FIG. 2B shows a change with time in set values of a target SIR (ordinate)
Figure 2B:
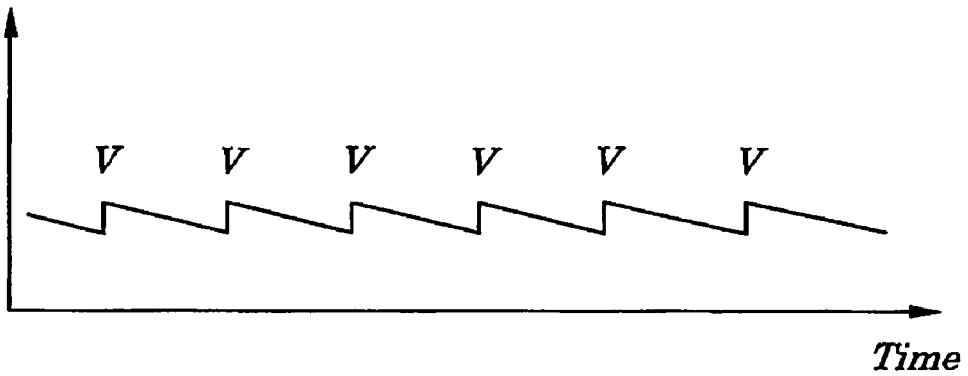
Figure 3A:
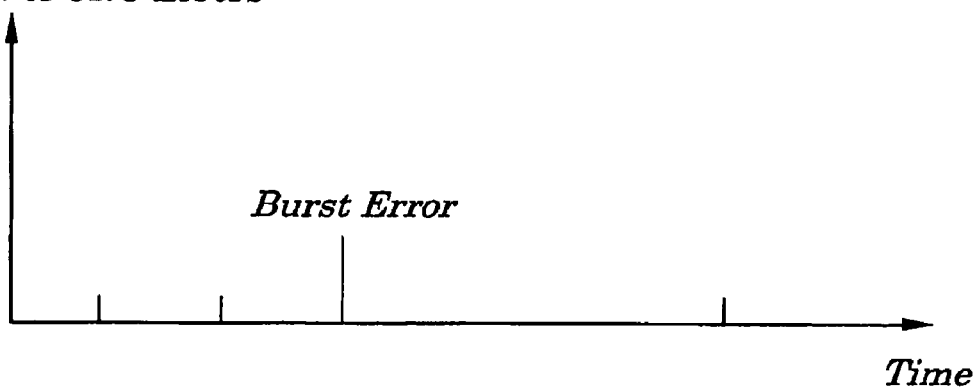
FIGS. 3A and 3B are diagrams explaining problems of conventional technology and FIG. 3A shows a change with time in the number of times of detection of CRC errors (ordinate) in a unit time interval and FIG. 3B shows a change with time in set values of a target SIR on a mobile unit.
Figure 3B:
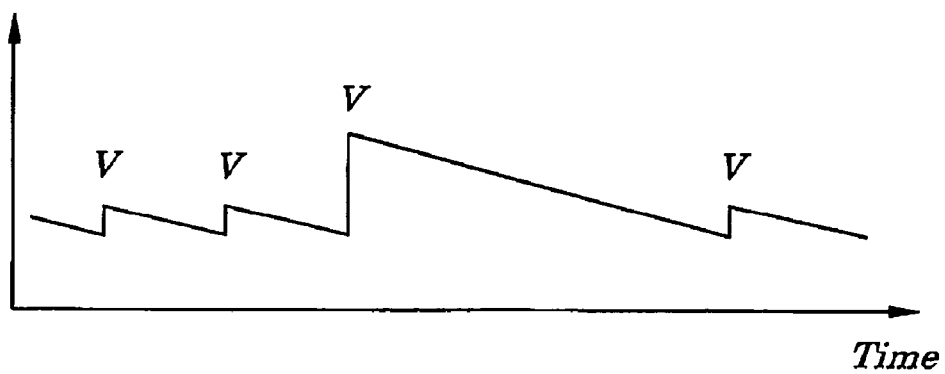

FIGS. 2A and 2B are diagrams explaining operations of the mobile telecommunication device, mobile unit 100, according to the embodiment of the present invention. FIG. 2A shows a change with time of the number of times of detection of CRC errors in a unit time interval (ordinate) and FIG. 2B shows a change with time of set values of a target SIR (ordinate).

As shown in FIG. 2, every time the number of times of detection of CRC errors in a unit time interval reaches an error number threshold value, a set value of the target SIR is raised.

However, unlike in the case of the conventional technology, even if a burst error occurs, the target SIR does not become extremely larger.

This is because, even if a burst-like error occurs and a frequency of detection of CRC errors to be calculated by the CRC error accumulating section 41 makes a correction to the detection frequency so that the detection frequency becomes the predetermined threshold value.

Thus, according to the mobile telecommunication device, mobile unit 100, according to the embodiment, even when the detection frequency of CRC errors calculated by the CRC error accumulating section 41 exceeds a predetermined threshold value, the accumulating error number correcting section 42 operates to make a correction to the detection frequency so that the detection frequency becomes equal to a predetermined threshold value and, therefore, even if a burst-like error occurs due to some reason, it is possible not to make a request asking the base station to raise an SIR excessively. As a result, the base station does not consume unnecessarily large transmitting power when carrying out transmission to a mobile unit 100 and, therefore, an extreme decrease in the number of users who can carry out communication at once in the area can be prevented.

It is apparent that the present invention is not limited to the above embodiments but may be changed and modified without departing from the scope and spirit of the invention. For example, in the above embodiment, the example is described in which, when the number of accumulated errors exceeds an error number threshold value, a correction is made to the number of accumulated errors so that the number of the accumulated errors becomes the error number threshold value. However, the present invention is not limited to this. For example, when the number of accumulated errors exceeds the error number threshold value, a correction may be made to the number of accumulated errors so that the number of the accumulated error is made small by multiplying the number of accumulated errors by a coefficient (for example, ½) being a positive value not larger than 1 (one) having been set in advance. Alternatively, if the number of accumulated errors exceeds the error number threshold value, a correction may be made to the number of the accumulated errors so that the number of the accumulated errors becomes a value being less than the error number threshold value. That is, if the number of the accumulated errors exceeds the threshold value of errors, a correction may be made to the number of accumulated errors so that the number of accumulated errors becomes a value being smaller than a number actually used.

Also, in the above embodiment, the example is described in which, if the number of accumulated errors exceeds the threshold value of the number of errors, an immediate correction is made to the number of accumulated errors. However, when the number of accumulated errors exceeds the threshold value of the number of errors, the number of accumulated errors is once set to be 0 (zero) and no correction is made to the number of accumulated errors and, if the number of errors accumulated in a subsequent time interval again exceeds the threshold value of the number of errors, a correction may be made to the number of accumulated errors; that is, in the case in which the detection frequency of CRC errors calculated by the CRC error accumulating section 41 in a plurality of time intervals in received data of errors. Moreover, the correction to be employed in this case may be a correction by which the number of the accumulated errors is made equal to a threshold value of the number of errors, a correction by which the number of accumulated errors is multiplied by a coefficient being a positive value being not larger than 1 (one), or a correction in which the number of the accumulated errors is made equal to a value being less than a threshold value of the number of errors.

Moreover, in the above embodiment, the example is explained in which a frequency of detection of errors in a unit time interval in received data is calculated by the error frequency calculating section. However, the error frequency calculating section may calculate a frequency of detection of errors in received data occurring in a unit time interval.

What is claimed is:

1. A mobile telecommunication terminal device comprising:

an error frequency calculating section to calculate detection frequency of errors received in received data;

an error frequency correcting section to make a correction in such a way that the detection frequency of errors becomes a value being smaller than an actual value when the detection frequency of errors calculated by the error frequency calculating section exceeds a predetermined value;

a target transmitting power setting section to decrease an SIR (Signal to Interference Power Ratio) to be targeted when the detection frequency of errors is not larger than a target detection frequency value and to increase a set value of the SIR to be targeted when the detection frequency of errors exceeds said target detection frequency value;

an SIR measuring section to measure an SIR of a received signal;

an SIR comparing section to compare the SIR measured by said SIR measuring section with the target SIR set by said target transmitting power setting section; and a transmitting power requesting section to make a request for lowering the SIR of the received signal when the measured SIR is judged by said SIR comparing section as being not smaller than the target SIR and a request for raising the SIR of the received signal when the measured SIR is judged by said SIR comparing section as being less than the target SIR.

2. The mobile telecommunication terminal device according to claim 1, wherein said error frequency calculating section calculates the detection frequency of CRC (Cyclic Redundancy Check) errors detected in received data.

3. The mobile telecommunication terminal device according to claim 1, wherein said error frequency correcting section makes a correction so that the detection frequency of errors calculated by said error frequency calculating section becomes said threshold value.

4. The mobile telecommunication terminal device according to claim 1, wherein said error frequency correcting section makes a correction to the detection frequency of errors calculated by said error frequency calculating section by multiplying the number of accumulated errors by a coefficient being less than 1 (one).

5. The mobile telecommunication terminal device according to claim 1, wherein said error frequency correcting section makes a correction so that the detection frequency of errors calculated by said error frequency calculating section becomes a value being less than said threshold value.

6. The mobile telecommunication terminal device according to claim 1, wherein said error frequency calculating section calculates the detection frequency of errors during a unit time interval in received data.

7. The mobile telecommunication terminal device according to claim 1, wherein said error frequency calculating section calculates the detection frequency of errors contained in received data per a unit time.

8. The mobile telecommunication terminal device according to claim 1, wherein said error frequency calculating section calculates the detection frequency of errors during a unit time interval in received data and wherein said error frequency correcting section makes a correction to the detection frequency of errors when the detection frequency of errors calculated by said error frequency calculating section exceeds a predetermined threshold value successively during a plurality of unit time intervals in received data.

9. The mobile telecommunication terminal device according to claim 1, wherein communication is carried out according to a code division multiplex access communication method.

10. A mobile telecommunication terminal device comprising:

an antenna, a decoding section to generate decoded data by decoding a signal received via said antenna;

an error detecting section to detect errors contained in the decoded data;

an error frequency calculating section to calculate detection frequency of errors to be detected by said error detecting section;

an error frequency correcting section to make a correction in such a way that the detection frequency of errors becomes a value being smaller than an actual value when the detection frequency of errors calculated by the error frequency calculating section exceeds a predetermined threshold value;

a target transmitting power setting section to decrease a set value of an SIR (Signal to Interference Power Ratio) to be targeted when the detection frequency of errors is not larger than a target detection frequency value and to increase said set value of the SIR to be targeted when the detection frequency of errors exceeds the target detection frequency value;

an SIR measuring section to measure an SIR of received signal based on the decoded data;

an SIR comparing section to compare the SIR measured by said SIR measuring section with the target SIR set by said target transmitting power setting section;

a transmitting power control data generating section to generate control data used to make a request for decreasing the SIR of the received signal when the measured SIR is judged by said SIR comparing section as being not smaller than the target SIR and to generate control data used to make a request for increasing the SIR of the received signal when the measured SIR is judged by said SIR comparing section as being less than the target SIR; and a signal transmitting section to transmit control data generated by said transmitting power control data generating section and encoded communication data.

11. The mobile telecommunication terminal device according to claim 10, wherein said error detecting section detects CRC errors in decoded data and said error frequency calculating section calculates the detection frequency of CRC (Cyclic Redundancy Check) errors detected by said error detecting section.

12. The mobile telecommunication terminal device according to claim 10, wherein said error frequency correcting section makes a correction so that the detection frequency of errors calculated by said error frequency calculating section becomes said threshold value.

13. The mobile telecommunication terminal device according to claim 10, wherein said error frequency correcting section makes a correction to the detection frequency of errors calculated by said error frequency calculating section by multiplying the number of accumulated errors by a coefficient being less than 1 (one).

14. The mobile telecommunication terminal device according to claim 10, wherein said error frequency correcting section makes a correction so that the detection frequency of errors calculated by said error frequency calculating section becomes a value being less than said threshold value.

15. The mobile telecommunication terminal device according to claim 10, wherein said error frequency calculating section calculates the detection frequency of errors during a unit time interval in received data.

16. The mobile telecommunication terminal device according to claim 10, wherein said error frequency calculating section calculates the detection frequency of errors contained in received data per a unit time.

17. The mobile telecommunication terminal device according to claim 10, wherein said error frequency calculating section calculates the detection frequency of errors during a unit time interval in received data and wherein said error frequency correcting section makes a correction to the detection frequency of errors when the detection frequency of errors calculated by said error frequency calculating section exceeds a predetermined threshold value successively during a plurality of unit time intervals in received data.

18. The mobile telecommunication terminal device according to claim 10, wherein communication is carried out according to a code division multiplex access communication method.

19. A mobile telecommunication method comprising:

a calculating step of calculating a detection frequency of errors in received data;

an error frequency correcting step of making a correction in such a way that the detection frequency of errors becomes a value being smaller than an actual value when the detection frequency of errors calculated by the error frequency calculating section exceeds a predetermined threshold value;

a target transmitting power setting step of decreasing a set value of an SIR (Signal to Interference Power Ratio) to be targeted when the detection frequency of errors—is not larger than a target detection frequency value and of increasing said set value of the SIR to be targeted when the detection frequency of errors exceeds the target detection frequency value;

an SIR measuring step of measuring an SIR of a received signal;

an SIR comparing step of comparing the SIR measured in said SIR measuring step with the target SIR set in said target transmitting power setting step; and a transmitting power requesting step of making a request for decreasing the SIR of the received signal when the measured SIR is not smaller than the target SIR and a request for increasing the SIR of the received signal when the measured SIR is less than the target SIR.

20. The mobile telecommunication method according to claim 19, wherein said calculating step comprises calculating a detection frequency of CRC (Cyclic Redundancy Check) errors detected in the received data.

21. A mobile telecommunication method comprising:

a decoding step of generating decoded data by decoding a signal received via an antenna;

an error detecting step of detecting errors contained in received data;

an error frequency calculating step of calculating a detection frequency of errors in said error detecting step;

an error frequency correcting step to making a correction in such a way that the detection frequency of errors becomes a value being smaller than an actual value when the detection frequency of errors calculated by the error frequency calculating section exceeds a predetermined threshold value;

a target transmitting power setting step of decreasing a set value of an SIR (Signal to Interference Power Ratio) to be targeted when the detection frequency of errors is not larger than a target detection frequency value and of increasing said set value of the SIR to be targeted when the detection frequency of errors exceeds the target detection frequency value;

an SIR measuring step of measuring an SIR of received signal based on the decoded data;

an SIR comparing step of comparing the SIR measured in said SIR measuring step with the target SIR set in said target transmitting power setting step;

a transmitting power control data generating step of generating control data used to make a request for decreasing the SIR of the received signal when the measured SIR is not smaller than the target SIR and of generating control data used to make a request for increasing the SIR of the received signal when the measured SIR is less than the target SIR; and a transmitting step of transmitting control data generated in said transmitting power control data generating step and encoded communication data.

22. The mobile telecommunication method according to claim 21, wherein said error detecting step comprises detecting CRC (Cyclic Redundancy Check) errors in the decoded data, and said error frequency calculating step comprises calculating a detection frequency of CRC errors detected in said error detecting step.

23. One or more computer readable media storing computer readable instructions that, when executed by a computer, perform a mobile telecommunication method, the mobile telecommunication method comprising:

a calculating step of calculating a detection frequency of errors in received data;

an error frequency correcting step of making a correction in such a way that the detection frequency of errors becomes a value being smaller than an actual value when the detection frequency of errors calculated by the error frequency calculating section exceeds a predetermined threshold value;

a target transmitting power setting step of decreasing a set value of an SIR (Signal to Interference Power Ratio) to be targeted when the detection frequency of errors is not larger than a target detection frequency value and of increasing said set value of the SIR to be targeted when the detection frequency of errors exceeds the target detection frequency value;

an SIR measuring step of measuring an SIR of a received signal;

an SIR comparing step of comparing the SIR measured in said SIR measuring step with the target SIR set in said target transmitting power setting step; and a transmitting power requesting step of making a request for decreasing the SIR of the received signal when the measured SIR is not smaller than the target SIR and a request for increasing the SIR of the received signal when the measured SIR is less than the target SIR.

24. The one or more computer readable media according to claim 23, wherein said calculating step comprises calculating a detection frequency of CRC (Cyclic Redundancy Check errors) detected in the received data.

25. One or more computer readable media storing computer readable instructions that, when executed by a computer, perform a mobile telecommunication method, the mobile telecommunication method comprising:

a decoding step of generating decoded data by decoding a signal received via an antenna;

an error detecting step of detecting errors contained in received data;

an error frequency calculating step of calculating a detection frequency of errors in said error detecting step;

an error frequency correcting step of making a correction in such a way that the detection frequency of errors becomes a value being smaller than an actual value when the detection frequency of errors calculated by the error frequency calculating section exceeds a predetermined threshold value;

a target transmitting power setting step of decreasing a set value of an SIR (Signal to Interference Power Ratio) to be targeted when the detection frequency of errors is not larger than a target detection frequency value and of increasing said set value of the SIR to be targeted when the detection frequency of errors exceeds the target detection frequency value;

an SIR measuring step of measuring an SIR of received signal based on the decoded data;

an SIR comparing step of comparing the SIR measured in said SIR measuring step with the target SIR set in said target transmitting power setting step;

a transmitting power control data generating step of generating control data used to make a request for decreasing the SIR of the received signal when the measured SIR is not smaller than the target SIR and of generating control data used to make a request for increasing the SIR of the received signal when the measured SIR is less than the target SIR; and a transmitting step of transmitting control data generated in said transmitting power control data generating step and encoded communication data.

26. The one or more computer readable media according to claim 25, wherein said error detecting step comprises detecting CRC (Cyclic Redundancy Check) errors in the decoded data, and said error frequency calculating step comprises calculating a detection frequency of CRC errors detected in said error detecting step.

27. A mobile telecommunication terminal device comprising:

an error frequency calculating means to calculate a detection frequency of errors received in received data;

an error frequency correcting means to make a correction in such a way that the detection frequency of errors becomes a value being smaller than an actual value when the detection frequency of errors calculated by the error frequency calculating section exceeds a predetermined threshold value;

a target transmitting power setting means to decrease an SIR (Signal to Interference Power Ratio) to be targeted when the detection frequency of errors is not larger than a target detection frequency value and to increase a set value of the SIR to be targeted when the detection frequency of errors exceeds said target detection frequency value;

an SIR measuring means to measure an SIR of a received signal;

an SIR comparing means to compare the SIR measured by said SIR measuring means with the target SIR set by said target transmitting power setting means; and a transmitting power requesting means to make a request for lowering the SIR of the received signal when the measured SIR is judged by said SIR comparing means as being not smaller than the target SIR and a request for raising the SIR of the received signal when the measured SIR is judged by said SIR comparing means as being less than the target SIR.

28. The mobile telecommunication terminal device according to claim 27, wherein said error frequency calculating means calculates the detection frequency of CRC (Cyclic Redundancy Check) errors detected in received data.

29. The mobile telecommunication terminal device according to claim 27, wherein said error frequency correcting means makes a correction so that the detection frequency of errors calculated by said error frequency calculating means becomes said threshold value.

30. The mobile telecommunication terminal device according to claim 27, wherein said error frequency correcting means makes a correction to the detection frequency of errors calculated by said error frequency calculating means by multiplying the number of accumulated errors by a coefficient being less than 1 (one).

31. The mobile telecommunication terminal device according to claim 27, wherein said error frequency correcting means makes a correction so that the detection frequency of errors calculated by said error frequency calculating means becomes a value being less than said threshold value.

32. The mobile telecommunication terminal device according to claim 27, wherein said error frequency calculating means calculates the detection frequency of errors during a unit time interval in received data.

33. The mobile telecommunication terminal device according to claim 27, wherein said error frequency calculating means calculates the detection frequency of errors contained in received data per a unit time.

34. The mobile telecommunication terminal device according to claim 27, wherein said error frequency calculating means calculates the detection frequency of errors during a unit time interval in received data and wherein said error frequency correcting means makes a correction to the detection frequency of errors when the detection frequency of errors calculated by said error frequency calculating means exceeds a predetermined threshold value successively during a plurality of unit time intervals in received data.

35. The mobile telecommunication terminal device according to claim 27, wherein communication is carried out according to a code division multiplex access communication method.

36. A mobile telecommunication terminal device comprising:
an antenna,
a decoding means to generate decoded data by decoding a signal received via said antenna;
an error detecting means to detect errors contained in the decoded data;
an error frequency calculating means to calculate a detection frequency of errors to be detected by said error detecting means;
an error frequency correcting means to make a correction in such a way that the detection frequency of errors becomes a value being smaller than an actual value when the detection frequency of errors calculated by the error frequency calculating section exceeds a predetermined threshold value;
a target transmitting power setting means to decrease a set value of an SIR (Signal to Interference Power Ratio) to be targeted when the detection frequency of errors is not larger than a target detection frequency value and to increase said set value of the SIR to be targeted when the detection frequency of errors exceeds the target detection frequency value;
an SIR measuring means to measure an SIR of received signal based on the decoded data;
an SIR comparing means to compare the SIR measured by said SIR measuring means with the target SIR set by said target transmitting power setting means;
a transmitting power control data generating means to generate control data used to make a request for decreasing the SIR of the received signal when the measured SIR is judged by said SIR comparing means as being not smaller than the target SIR and to generate control data used to make a request for increasing the SIR of the received signal when the measured SIR is judged by said SIR comparing means as being less than the target SIR; and
a signal transmitting means to transmit control data generated by said transmitting power control data generating means and encoded communication data.

37. The mobile telecommunication terminal device according to claim 36, wherein said error detecting means detects CRC errors in decoded data and said error frequency calculating means calculates the detection frequency of CRC (Cyclic Redundancy Check) errors detected by said error detecting means.

38. The mobile telecommunication terminal device according to claim 36, wherein said error frequency correcting means makes a correction so that the detection frequency of errors calculated by said error frequency calculating means becomes said threshold value.

39. The mobile telecommunication terminal device according to claim 36, wherein said error frequency correcting means makes a correction to the detection frequency of errors calculated by said error frequency calculating means by multiplying the number of accumulated errors by a coefficient being less than 1 (one).

40. The mobile telecommunication terminal device according to claim 36, wherein said error frequency correcting means makes a correction so that the detection frequency of errors calculated by said error frequency calculating means becomes a value being less than said threshold value.

41. The mobile telecommunication terminal device according to claim 36, wherein said error frequency calculating means calculates the detection frequency of errors during a unit time interval in received data.

42. The mobile telecommunication terminal device according to claim 36, wherein said error frequency calculating means calculates the detection frequency of errors contained in received data per a unit time.

43. The mobile telecommunication terminal device according to claim 36, wherein said error frequency calculating means calculates the detection frequency of errors during a unit time interval in received data and wherein said error frequency correcting means makes a correction to the detection frequency of errors when the detection frequency of errors calculated by said error frequency calculating means exceeds a predetermined threshold value successively during a plurality of unit time intervals in received data.

44. The mobile telecommunication terminal device according to claim 36, wherein communication is carried out according to a code division multiplex access communication method.

* * * * *